(12) United States Patent
Kameno et al.

(10) Patent No.: US 6,282,234 B1
(45) Date of Patent: Aug. 28, 2001

(54) SPREAD SPECTRUM RECEIVER

(75) Inventors: Toshiaki Kameno, Chiba; Keiji Hikosou, Narashino, both of (JP)

(73) Assignee: Sharp Kabushiki Kaisha, Osaka (JP)

( * ) Notice: Subject to any disclaimer, the term of this patent is extended or adjusted under 35 U.S.C. 154(b) by 0 days.

(21) Appl. No.: 09/551,837

(22) Filed: Apr. 18, 2000

(30) Foreign Application Priority Data

Apr. 28, 1999 (JP) .................................................. 11-121529

(51) Int. Cl.$^7$ .................................................. H04B 7/216
(52) U.S. Cl. .......................................... 375/148; 370/342
(58) Field of Search .................................. 375/148, 147, 375/150, 142, 144; 370/335, 320, 342

(56) References Cited

U.S. PATENT DOCUMENTS 6,188,679 * 2/2001 Sato ...................................... 370/335
6,188,682 * 2/2001 Takagi et al. ......................... 370/342
6,208,683 * 3/2001 Mizuguchi et al. ................. 375/140

FOREIGN PATENT DOCUMENTS 10-190528   7/1998 (JP) .

* cited by examiner

Primary Examiner—Temesghen Ghebretinsae
(74) Attorney, Agent, or Firm—Nixon & Vanderhye P.C.

(57) ABSTRACT

Radio signals from a base station are received by an antenna, and amplified, filtered, frequency converted and detected in a radio section, to thereby obtain baseband signals. A path search section searches the baseband signals, and detects a peak position in each path. Based on the detected timing relations, a code generator in a DLL section corresponding to each path is operated, to thereby obtain a demodulated output. A buffer section in a timing adjusting section fetches the demodulated output and trues up the phases therein, and the demodulated signals whose phases have been trued up are added in the RAKE synthesis circuit.

16 Claims, 12 Drawing Sheets

FIG. 6A
"Input"
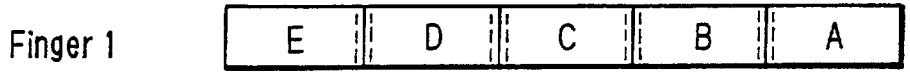
Finger 1
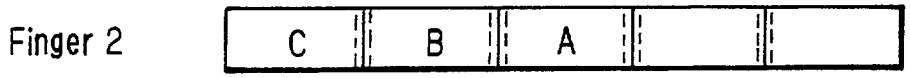
Finger 2
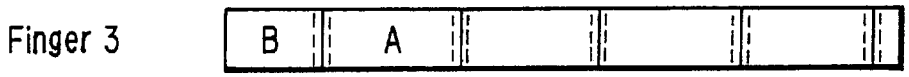
Finger 3
Write timing pulse
ck
"Shift register"
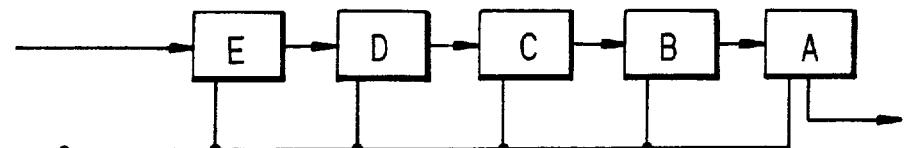
ck
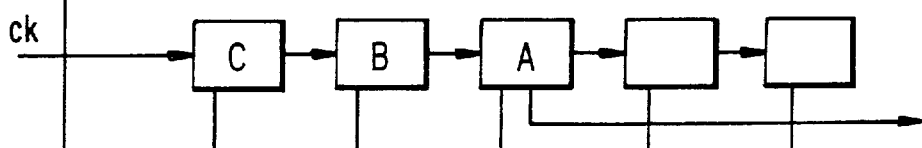
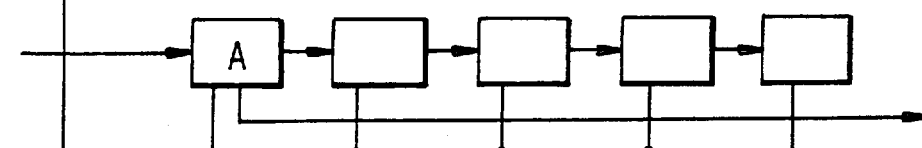
Possibility that B comes in due a fluctuation
$\frac{B}{T}$

FIG. 6B
"Buffer"
Finger 1
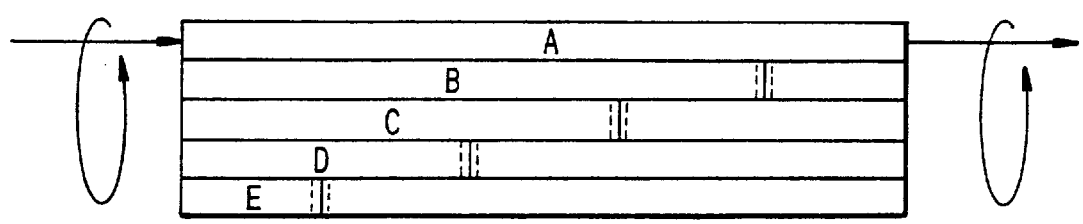
Finger 2
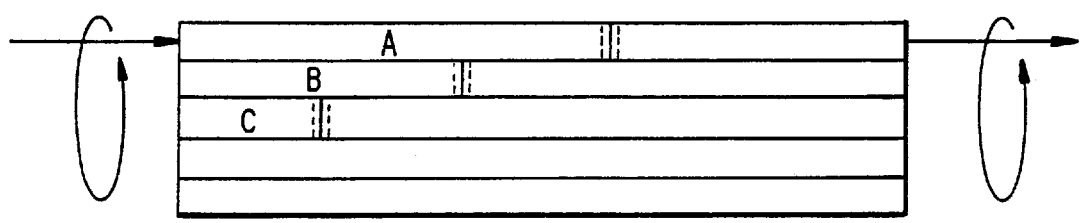
Finger 3
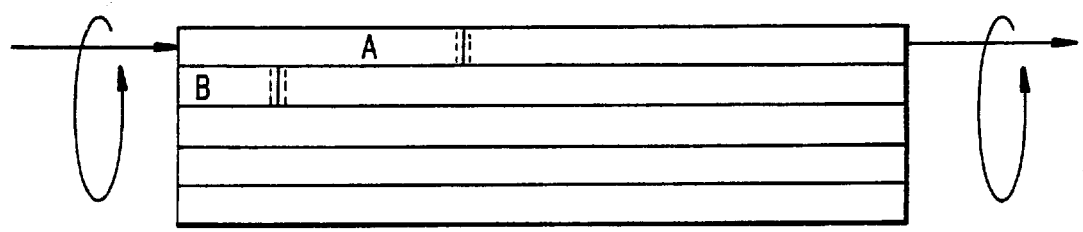

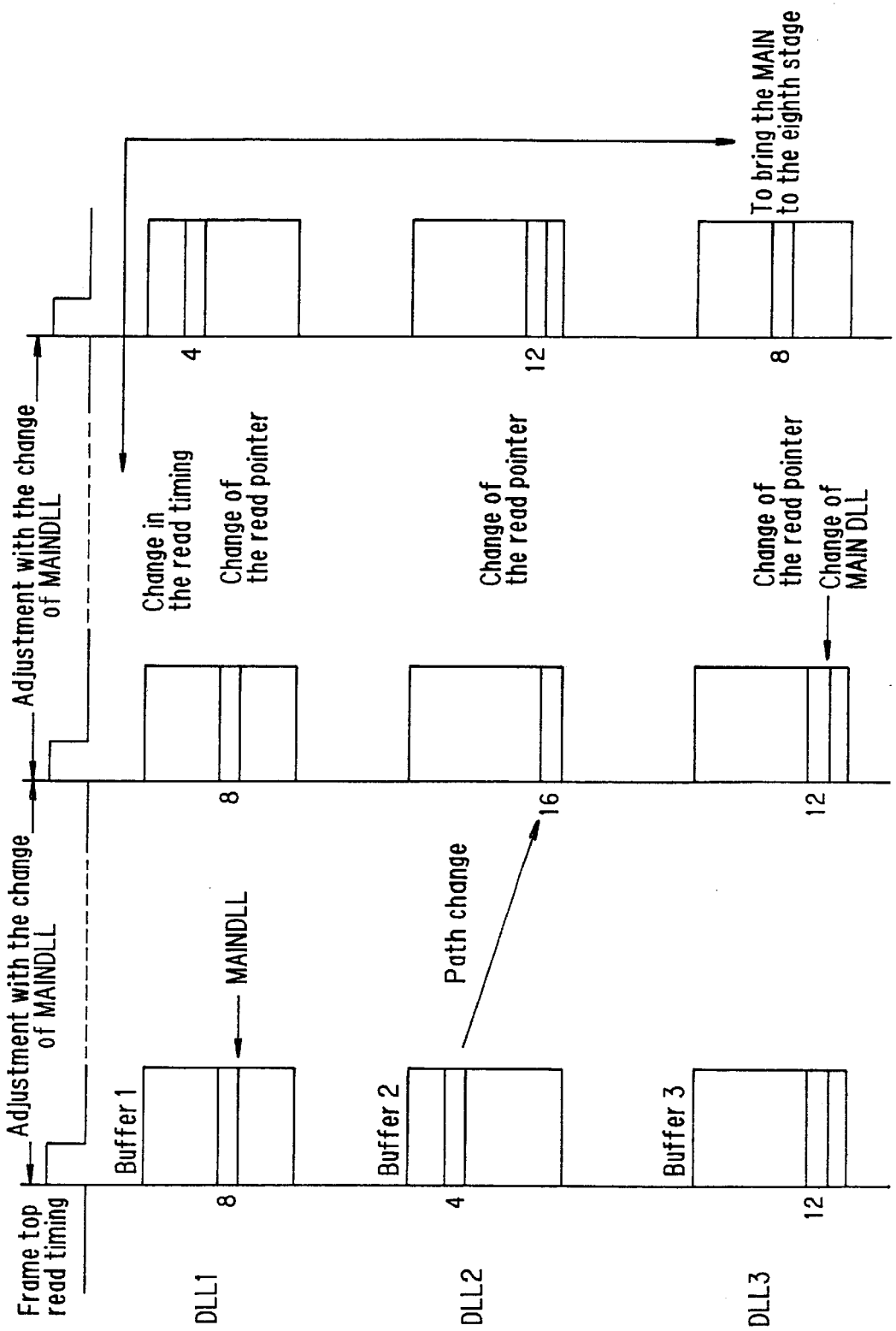

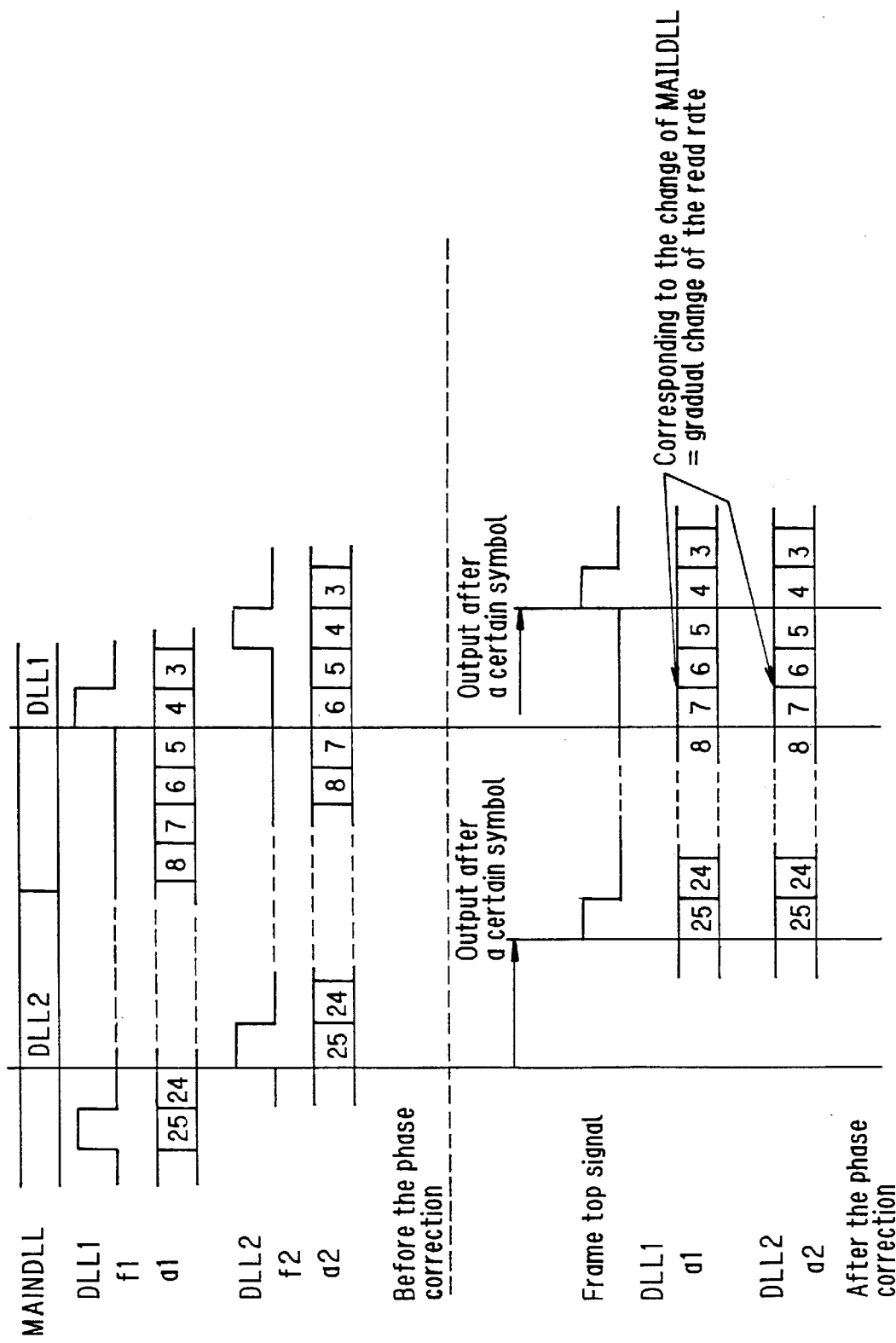

SPREAD SPECTRUM RECEIVER

BACKGROUND OF THE INVENTION

(1) Field of the Invention

The present invention relates to a spread spectrum receiver in a CDMA (code division multiple access) system, and more specifically, relates to a spread spectrum receiver having an excellent interference immunity, by truing up the phase difference in the demodulated path data due to a plurality of base stations and a multipath, thereby enabling to utilize the data in a RAKE synthesis section.

(2) Description of the Prior Art

With the CDMA system, a "spread" processing is performed wherein a base band signal which has been subjected to a primary modulation on the transmission side is multiplied by spread codes different for each channel, to thereby send out the signal. On the receiver side, a "despread processing" is performed wherein the same spread codes as those of the transmission side are multiplied to the spectrum signal, to thereby take out the original primary signal modulation signal. The primary modulation signal is passed through a normal demodulation circuit, thereby the base band signal is reproduced. When the spread codes are different between the transmitter side and the receiver side, there is no correlation between them, hence any signal cannot be taken out. Therefore, with the CDMA system, it is possible to take out an intended channel from received signals in which a plurality of channels are mixed in the same frequency.

The land mobile communication is characterized in that the radio wave can reach to a relatively remote area, and can is easily transmitted even to the back side of obstacles such as buildings due to large diffraction effect, etc., therefore in many cases, it utilizes a frequency band of from 800 MHz to 2 GHz. However, since reflection and diffraction of the electromagnetic wave are caused due to the obstacles, a plurality of propagation paths (multipath) are formed. That is to say, since the transmission distances of the radio wave are different, a delay is caused due to the routes when the radio waves emitted from the same spot reach a certain spot. In this situation, at the time of demodulation, if the timing of despreading symbol synchronization is gradually shifted, a plurality of correlation peaks can be obtained.

According to the phase difference (delay time difference) appeared in the delay profile, despreading processes and DLLs (Delay Locked Loop) are operated respectively independently. By multiplying the obtained demodulation output by a proper coefficient to thereby add respective multipath input signals, excellent reception characteristics can be obtained. This is referred to as "RAKE synthesis". The phase difference occurred here can be presumed from parameters such as cell radius or the like of the target communication system. It is necessary to perform the RAKE synthesis for the respective demodulation output, considering the phase difference up to the presumed range.

A conventional method of RAKE-synthesizing the demodulation output (path data) having a plurality of phase differences (delay time differences) caused by the multipath described above is disclosed in, for example, Japanese Patent Application Laid-Open Hei 10 No. 190528. With this method, as shown in FIG. 1, synchronous search is performed by a timing control circuit, to calculate the phase difference from the peak position in the path. Then, by adjusting a stage to take out the data, using a stage-variable type shift register, based on the phase difference information, the phase difference is absorbed.

FIG. 1 shows a three-finger type RAKE synthesis method having three sets of a code generator 114, a corrector 115 and a synchronous detection circuit 116. Signals received by an antenna 111 are amplified, frequency-converted and detected in a radio section 112 and converted to baseband signals. A phase difference in each path is determined from the correlation peak position by a path search section 113, and a despreading code is generated by the code generator 114, to thereby operate the corrector 115 at a timing indicated by the path search section 113, hence the correlation output of each path can be obtained. Then, the results of each output detected by the synchronous detection circuit 116 are taken into a shift register 117, then stages are set and delayed, considering the phase difference in each path indicated by the path search section 113, to thereby true up the phase, thus enabling a synthesis by means of a RAKE synthesis circuit 118.

With this spread spectrum receiver, the phase difference (delay time difference) and power (amplitude) change in each path, with timewise changes in the multipath propagation path. Corresponding the changes, it becomes necessary to true up the phase so that the RAKE synthesis becomes possible without causing any loss in the path data. However, with a construction using a DLL for demodulation, the demodulation outputs such as the path data and the frame synchronous signals have fluctuations for a portion of the system clock, hence there is a possibility that a fetch of the path data may be failed, with the shift register construction in the conventional example. This leads to a increase of an error rate. Moreover, with the shift register construction, if it is tried to correspond to the multipath changes as much as possible, the circuit size becomes large, causing a problem in that the power consumption increases.

SUMMARY OF THE INVENTION

With a view to solving the above problems, it is an object of the present invention to provide a spread spectrum receiver in a CDMA system which can improve the reception level without utilizing the result of path search, which can be made small and which can reduce the power consumption.

The present invention has been completed to attain the above-described object, and the gist thereof is as follows.

A first gist of the present invention is a spread spectrum receiver in a CDMA system comprising:

a radio section for detecting spread spectrum input signals and converting them to baseband signals;

a path search section for performing a path search with respect to the baseband signals to determine the phase difference in each path;

a DLL section for despreading and demodulating the baseband signals for each path, at a timing indicated by the path search section;

a timing adjusting section for truing up the phase of the demodulated signals from the DLL section with a predetermined timing and outputting the signals, respectively; and a RAKE synthesis section for RAKE-synthesizing the signals from the timing adjusting section;

the timing adjusting section comprising:

a buffer section for storing and holding the signals from the DLL section based on the timing indicated by the path search section, and outputting signals in an address indicated by a read signal; and a read signal control section for indicating an address and a timing by means of the read signal, so that the signals in each path held by the buffer section are output with the phase being trued up.

A second gist of the present invention resides in a spread spectrum receiver according to the gist one, wherein the buffer section consists of a SRAM.

A third gist of the present invention resides in a spread spectrum receiver according to the gist one, wherein the buffer section consists of a FIFO.

A fourth gist of the present invention resides in a spread spectrum receiver according to the gist one, wherein the read signal control section outputs the read signal which trues up the phase difference in each signal timewise, based on the signal from the DLL section serving as a reference.

A fifth gist of the present invention resides in a spread spectrum receiver according to the gist two, wherein the read signal control section outputs the read signal which trues up the phase difference in each signal timewise, based on the signal from the DLL section serving as a reference.

A sixth gist of the present invention resides in a spread spectrum receiver according to the gist three, wherein the read signal control section outputs the read signal which trues up the phase difference in each signal timewise, based on the signal from the DLL section serving as a reference.

A seventh gist of the present invention resides in a spread spectrum receiver according to the gist four, wherein the timing adjusting section is provided with a reference DLL monitoring section which corresponds to a change in the signal from the DLL section serving as the reference, following a change in the reception condition of the DDL, monitors the change and changes the read signal from the read signal control section.

An eighth gist of the present invention resides in a spread spectrum receiver according to the gist five wherein the timing adjusting section is provided with a reference DLL monitoring section which corresponds to a change in the signal from the DLL section serving as the reference, following a change in the reception condition of the DDL, monitors the change and changes the read signal from the read signal control section.

A ninth gist of the present invention resides in a spread spectrum receiver according to the gist six, wherein the timing adjusting section is provided with a reference DLL monitoring section which corresponds to a change in the signal from the DLL section serving as the reference, following a change in the reception condition of the DDL, monitors the change and changes the read signal from the read signal control section.

A tenth gist of the present invention resides in a spread spectrum receiver according to the gist four, wherein even if the signal serving as the reference changes timewise, the read signal control section changes the read rate of the read signal by several clocks according to the change.

An eleventh gist of the present invention resides in a spread spectrum receiver according to the gist five, wherein even if the signal serving as the reference changes timewise, the read signal control section changes the read rate of the read signal by several clocks according to the change.

A twelfth gist of the present invention resides in a spread spectrum receiver according to the gist six, wherein even if the signal serving as the reference changes timewise, the read signal control section changes the read rate of the read signal by several clocks according to the change.

A thirteenth gist of the present invention resides in a spread spectrum receiver according to the gist seven, wherein even if the signal serving as the reference changes timewise, the read signal control section changes the read rate of the read signal by several clocks according to the change.

A fourteenth gist of the present invention resides in a spread spectrum receiver according to the gist eight, wherein even if the signal serving as the reference changes timewise, the read signal control section changes the read rate of the read signal by several clocks according to the change.

A fifteenth gist of the present invention resides in a spread spectrum receiver according to the gist nine, wherein even if the signal serving as the reference changes timewise, the read signal control section changes the read rate of the read signal by several clocks according to the change.

A sixteenth gist of the present invention resides in a spread spectrum receiver according to the gist four to fifteen, wherein the timing adjusting section restricts the phase difference in each signal within a range of specifications, based on the signal serving as the reference, takes it into the buffer section, and trues up the phase timewise according to the signal from the DLL serving as the reference.

BRIEF DESCRIPTION OF THE DRAWINGS

FIGS. 6A and 6B are diagrams for illustrating write and read operations of the path data, comparing a conventional example and an embodiment of the present invention, FIG. 10 is a diagram in the case where a symbol signal serving as a reference at the time of truing up the phase is changed in the middle of the operation, and FIG. 11 is a diagram in the case where a symbol signal serving as a reference at the time of truing up the phase while using two fingers for the operation is changed in the middle of the operation.

DESCRIPTION OF THE PREFERRED EMBODIMENTS

The characteristics of a spread spectrum receiver in a CDMA system according to the present invention will now be summarized.

The spread spectrum receiver in a CDMA system according to the present invention does not use a conventional shift register whose circuit size becomes large, as a circuit for fetching the path data from a DLL and truing up the phase thereof. The present invention is characterized by having a buffer for fetching the data which is not affected by a fluctuation occurring in the signals from the DLL, and generating write and read timing signals from timing signals such as frame synchronizing signals output from the DLL to thereby adjust the timing.

Figure 2:
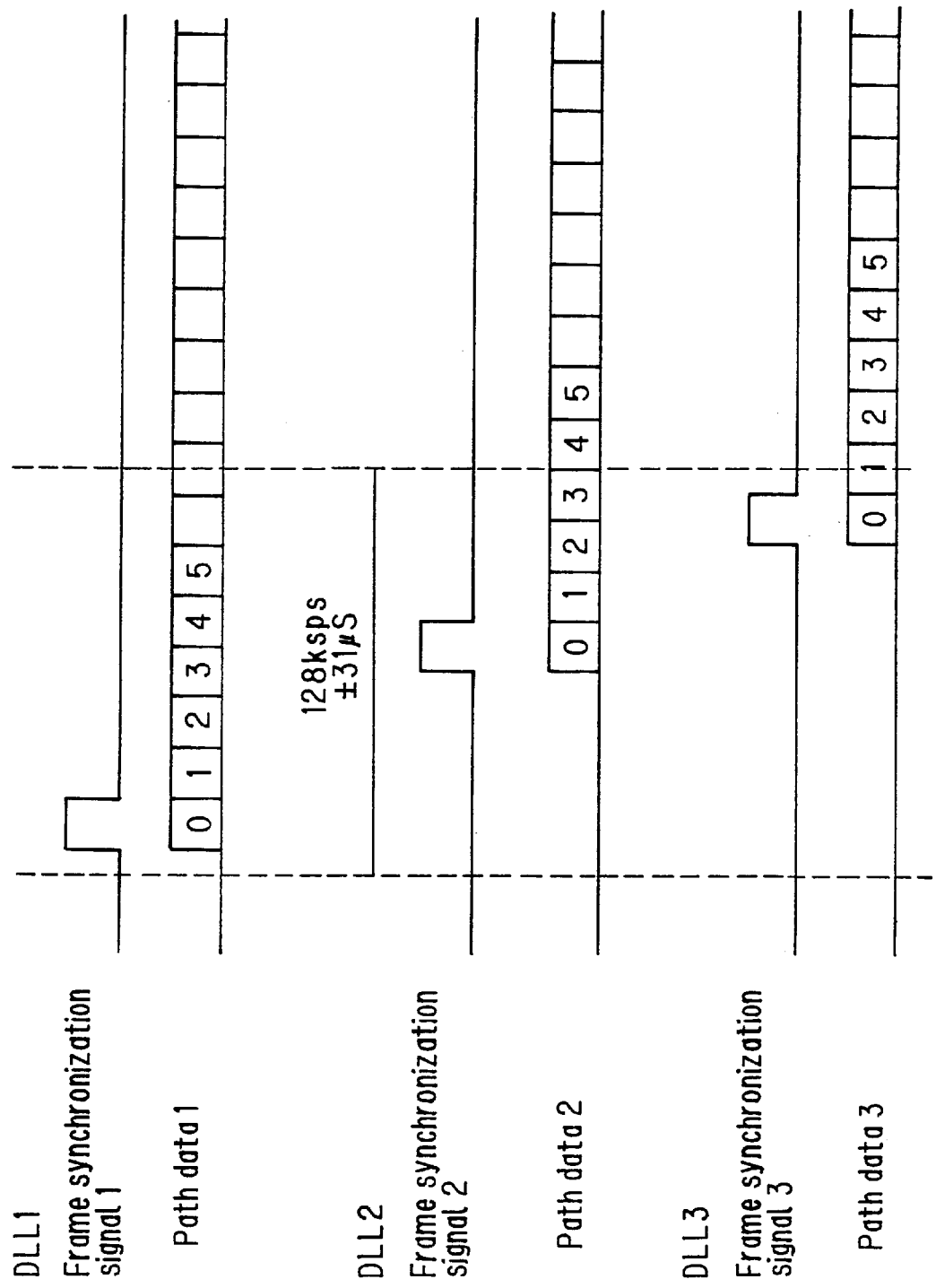
FIG. 2 is a diagram showing an output signal from a plurality of DLLs having a phase difference due to a multipath.

In FIG. 2, demodulated signals from the DLL are signals having a phase difference (delay time difference), which are obtained as a result of independent operation of a plurality of DLLs based on the results of a path search. However, it is analyzed how much phase difference (delay time difference) will be caused theoretically from the constraints on the communication system, and if the phase can be trued up within that range, the reception characteristics are not damaged.

With the current portable telephone/cellular telephone system, it is considered that the radius of the cell is from several km to several tens km, and the delay time becomes several tens $\mu$s. Therefore, it is considered that the delay time of several tens $\mu$s exists in the multipath components. Here, considering the above situation, a RAKE synthesis function with respect to signals of, for example, up to ±31 $\mu$s will be described.

The current portable telephone/cellular telephone system is mainly utilized as voice communications, and as the transmission rate, for example, 32 ksps is used. However, since multi-media communications such as data and images will be required in the portable telephone/cellular telephone system in the future, the data transmission rate should be increased. In the description below, the data transmission at 128 ksps which is a speed of, for example, four times the speed of 32 ksps of the voice transmission is assumed. In FIG. 2, baseband signals at 128 ksps are being received, and it is shown that if the DLL output (MAINDLL) serving as the reference is defined (DLL2 in FIG. 3), other signals also exist within ±31 $\mu$s from the position, that is, within ±4 symbols in the case of 128 ksps.

Figure 3:
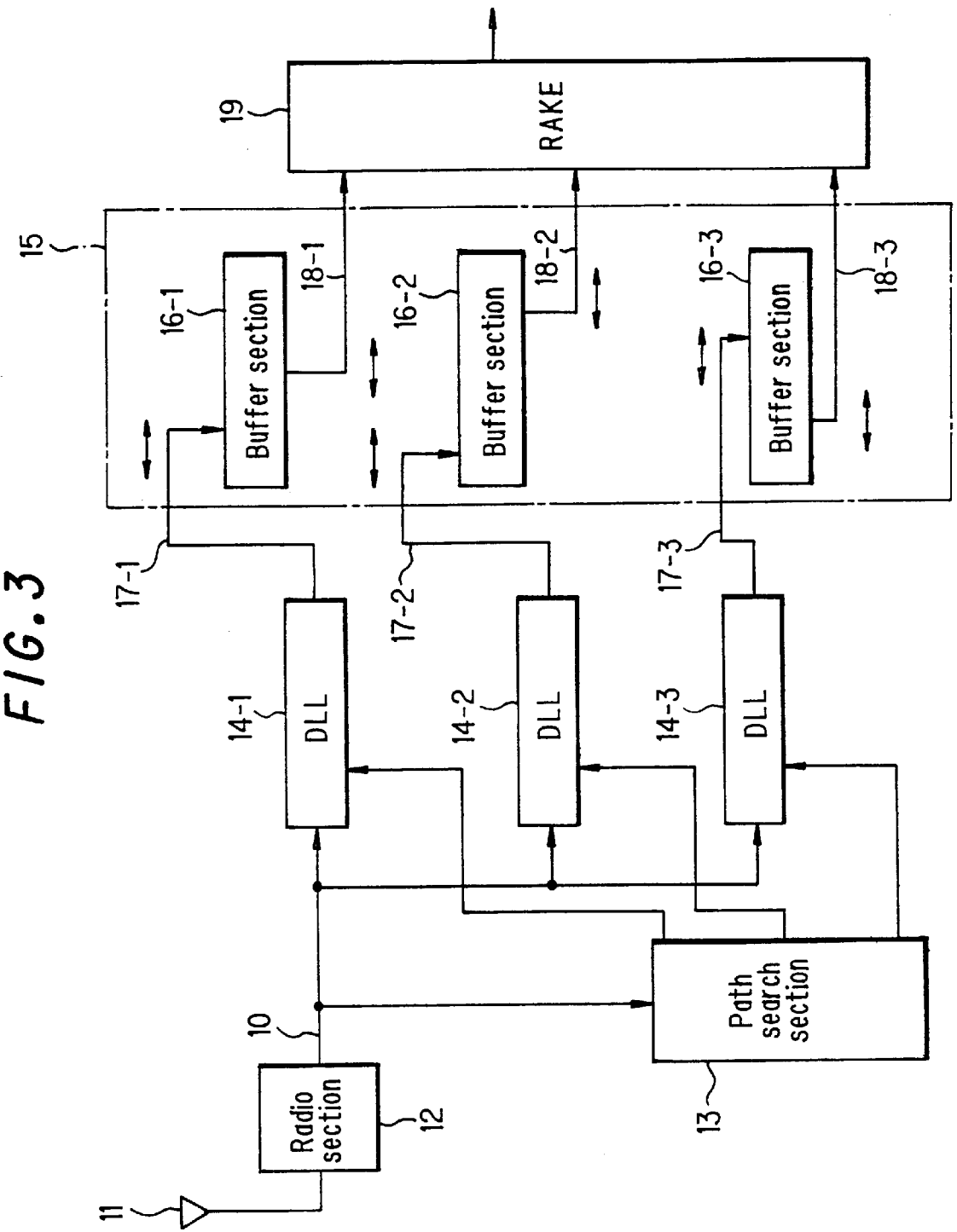
FIG. 3 is a block diagram showing a first embodiment of a spread spectrum receiver according to the present invention.

The received input signals via the multipath consist of, for example, three paths, and correspond to the path data 1, 2 and 3, respectively. As shown in FIG. 3, the transmission data consists of symbol data of 128 ksps shown by the symbol numbers 0, 1, 2, 3, 4, 5 . . . , and a certain number of symbol data constitutes one frame collectively. The frame synchronization signal showing the top of the frame in the transmission data exists, as shown in FIG. 2, in the position of the data symbol number 0, as a pulse signal for each frame. This assumes a communication system in which the maximum phase difference of ±31 $\mu$s is caused, as described above.

With the present invention, when it is necessary to change the DLL which has bee set as a reference, with the timewise change in the multipath propagation path, the output of another DLL is set as a new reference, and the timing adjusting section changes the read timing. This is equivalent to moving a read pointer of the buffer which stores the data in the DLL set as the new reference to the center of the buffer. Similarly, with respect to other buffers which store the path data which is expected to be (timewise) before or after the reference signal, the phase difference in each path is trued up without losing any path data, by changing the read timing. In this manner, it becomes possible to operate the RAKE synthesis function corresponding to the path changes.

Next is a description of embodiments of the present invention, with reference to accompanying drawings.

<First Embodiment>

The first embodiment of the present invention is a circuit for performing a RAKE synthesis by fetching a plurality of path data from a plurality of DLLs in a unit of symbols, and truing up the phase difference between several symbols before and after, based on the DLL output set as the reference.

FIG. 3 is a block diagram showing a construction of a spread spectrum receiver. A radio signal from a base station is received by an antenna 11, amplified and detected through filtering and frequency conversion in a radio section 12, to thereby obtain a baseband signal 10. A path search section 13 searches the baseband signal 10, and detects a peak position in each path. Based on the detected timing relations, code generators in DLL sections 14-1, 2 and 3 corresponding to each path are operated to obtain demodulated outputs 17-1, 2 and 3. Buffer sections 16-1, 2 and 3 in a timing adjusting section 15 fetch the demodulated outputs 17-1, 2 and 3 and true up the phases, and the demodulated signals 18-1, 2 and 3 whose phases are trued up are added in a RAKE synthesis circuit 16. Here, for making the description simple, the construction corresponds to three paths, but even if the number of paths increases or decreases depending upon the intended system condition, the effects of the present invention can be maintained.

Figure 4:
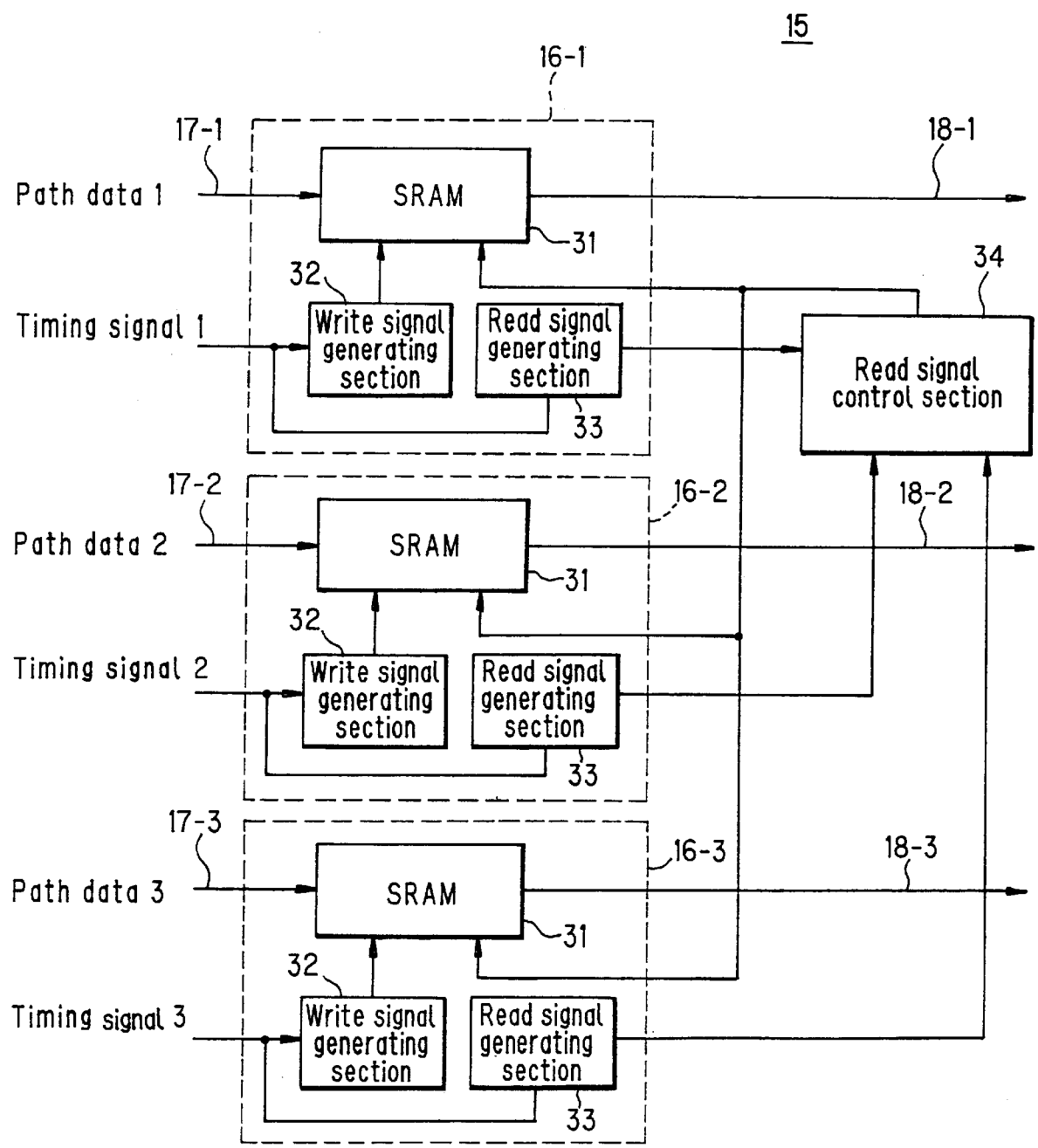
FIG. 4 is a block diagram showing a construction of a timing adjusting section.

FIG. 4 is a block diagram showing a specific construction of the timing adjusting section 15. The timing adjusting section 15 comprises buffer sections 16-1, 2 and 3 which store and hold the path data from a DLL14 and output the path data at a specified timing, and a read signal control section 34 which adjusts the read timing so that the phases of the demodulated signals 17-1, 2 and 3 serving as each path data are trued up. The buffer sections 16-1, 2 and 3 comprise a SRAM 31, a write timing signal generating section 32, and a read timing signal generating section 33, respectively. The buffer sections 16-1, 2 and 3 are arranged in a plurality of numbers (here, three as an example) in parallel for the number of fingers (the number of paths) in the spread spectrum receiver.

Figure 5:
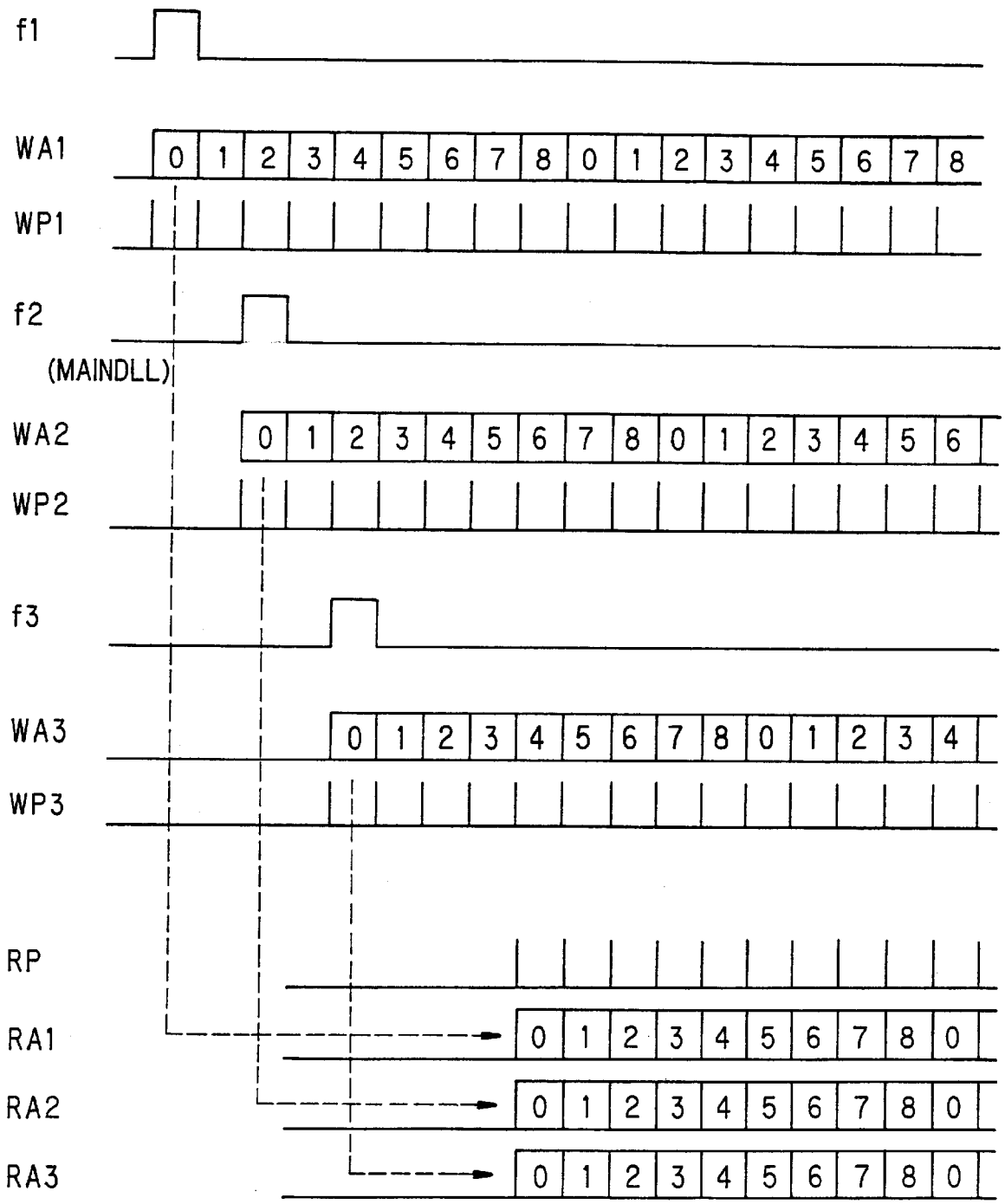
FIG. 5 is a diagram showing a processing for truing up the phase in a timing adjusting section.

Below is a description of the operation of the read signal control section 34 in FIG. 4, with reference to FIG. 5.

Write signals (write pulses) WP1, WP2, WP3 are generated from frame synchronization signals f1, f2, f3 in each DLL (timing signals 1, 2, 3 in FIG. 4) and symbol synchronization signals (not shown), by the write timing signal generating section 32, and each symbol data is written in the SRAM 31 in the order of addresses shown in memory addresses (write addresses) WA1, WA2, WA3. The address counter is automatically counted. In FIG. 5, it is assumed that the DLL2 in FIG. 3 is designated as a MAINDLL serving as a reference, and the phase difference of ±2 symbols is adjusted and trued up (absorbed). However, considering a reserve of two times and the output timing, from 0 to 8 are counted so as to be shown in the memory addresses WA1, WA2, WA3, such that after symbols (=4× 2+1), the output is performed with the phases being trued up.

At the same time, read signals for each DLL are generated from the frame synchronization signals by the read timing signal generating section 33, corresponding to the symbol rate. Of the read signals for each DLL, a read signal which has been specified as the MAIDLL by the read signal control section 34 is chosen, and this signal is designated as the read signal RP (read pulse) for each buffer section, thereby the phases can be trued up. The read start address is held at the time of writing by means of the first WP. Here, if seen from the data stored in the buffer, specifying as a reference is equivalent to that at the time of reading the path data at the top of the frame, the read pointer is moved to the center of the buffer, and the read pointers of buffers for storing other DLLs are set in the addresses before and behind thereof, corresponding to the phase relations of the path data, and the addresses are updated and read, while maintaining the positional relations.

The present invention is not affected by the influence of fluctuations contained in the signals from the DLL. This will be described by comparing a conventional shift register and the present invention, with reference to FIGS. 6A and 6B. As an example, it is assumed that input path data is input independently in a unit of symbols, A, B, C, D, E . . . , with a construction of three fingers, for each finger. Even if the number of fingers increase or decrease, the principle is the same. The input path data has fluctuations due to the tracking performance of the DLL. Write and read operations are described for a case of a conventional example adopting a shift register in FIG. 6A, and for a case where the buffer circuit of the present invention is adopted in FIG. 6B, respectively. In FIG. 6A, the number of stages of the shift register and from which tap the output is taken out are determined from the phase relations of the input path data obtained as a result of the path search.

Figure 1:
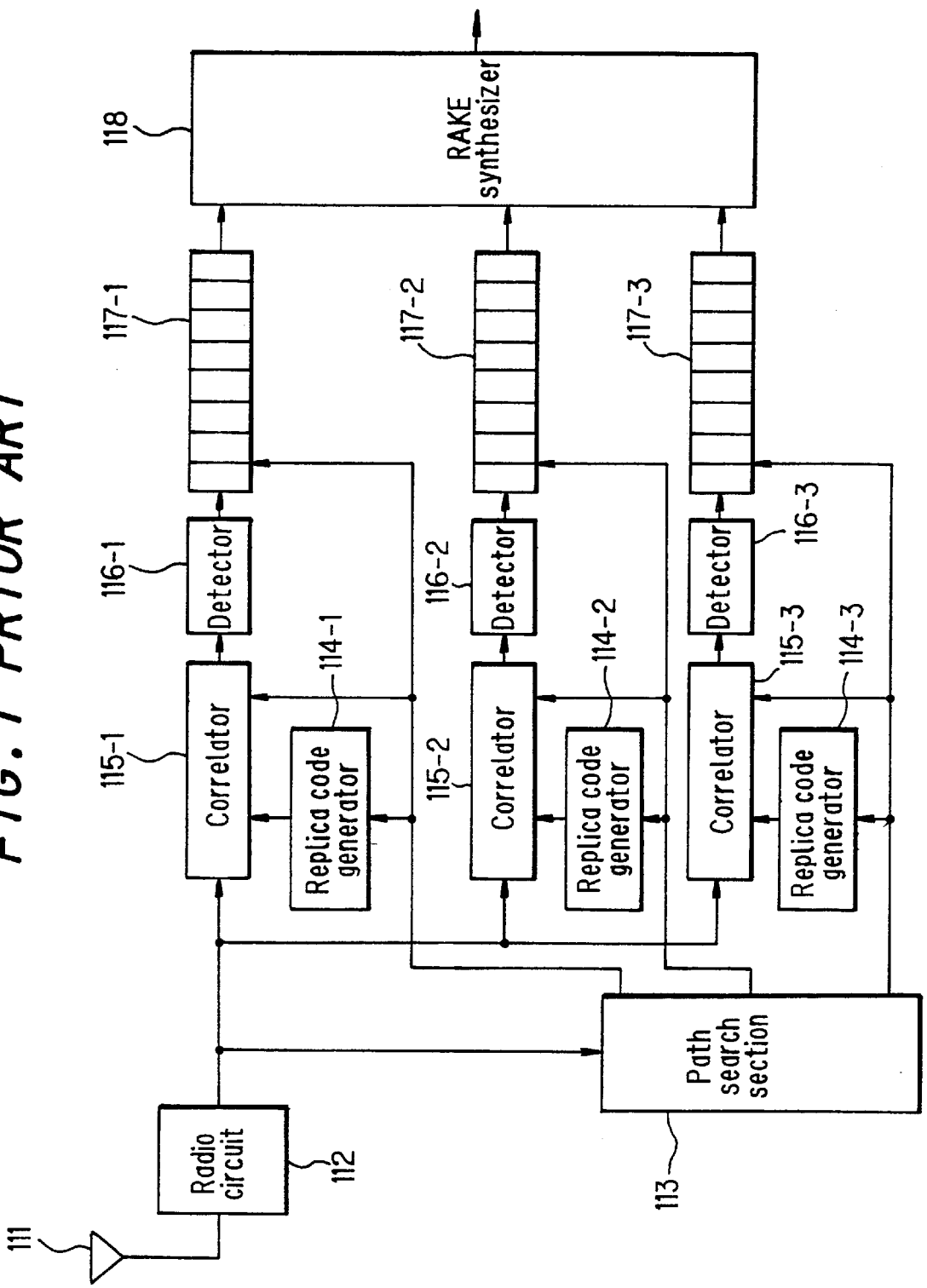
FIG. 1 is a block diagram showing a conventional spread spectrum receiver.

In this case, it is assumed that the phase is delayed in the order of fingers 1, 2 and 3. In the conventional example, as for the write to the shift register corresponding to each finger, a write timing pulse ck common to the shift registers arranged in parallel is generated from an unillustrated timing control section (included in the path search section 113 in FIG. 1).

In the case of read, the data is read from a predetermined tap at the same timing, and basically the phase is trued up here. Since each finger is independently operating and the path data contains fluctuations, as shown in the case of the finger 3 in the figure, there is a possibility that the tap where the data is stored may be shifted by one tap according to the fluctuations, depending upon the phase relations of the path data and the phase relations with the write timing pulse. Therefore, if it is continued to take out the data from the same tap at all times, there is a possibility that a loss may be caused in the output of the path data. However, it is difficult to sequentially change the take-out position from the shift register corresponding to the fluctuation, and it can be said that it is a problem that is inherently caused, as long as the shift register is adopted, as in the conventional example.

On the other hand, in the case of the buffer circuit of the present invention in FIG. 6B, the data is held for a period corresponding to the range where the phase is desired to be trued up, and after the data of the finger 3, which is the last finger, has been fetched, the data is output after a certain symbol (after the data is held for at least one symbol). With regard to the output time, it depends upon a matter of specifications that to which range the multipath is trued up to perform the RAKE synthesis. That is to say, a finger serving as a reference is decided, and if it is necessary that the multipath is trued up over several symbols before and behind thereof, it is designed such that the data is output after the specification range +1 symbol since the input of the finger serving as the reference. Therefore, even if there is a fluctuation, only the timing to be fetched is shifted, and the timing to be taken out is constant. Furthermore, since there is a timewise reserve for the output by at least one symbol in each finger, it is possible to output the path data reliably in the order of input, and the existence of the fluctuation can be ignored.

In FIG. 6B, the number of stages of the buffer for truing up the fingers 1 to 3 is set to be 5 stages. This is because the path data for 2 symbols before and after the finger serving as the reference is trued up, and the purpose thereof is to hold the data of 2×2+1=5 symbols. Designating the finger 1 as the reference, the path data is fetched from the top in sequence. The timing signal for the fetch is, as described above with reference to FIG. 5, generated for each finger from the frame synchronization signals and the symbol synchronization signals which synchronize with unillustrated each path data. After the fetch of the first symbol A, the address of the buffer is automatically updated, and the next symbol B is stored. When the other symbols are fetched, the symbol A is held until being output.

When the path data up to the finger 3 is fetched by repeating the above-described operation, after the path data of the finger 3 whose phase retards most has been fetched, if the path data is read out in sequence from the first data in each finger after 1 symbol, the phase can be trued up. In the address where the data has been read, the data may be overwritten. Hence, as shown in the figure, the address can be repeatedly used. With this method, the path data is held for a longer period of time compared to the case using the shift register, and the data is read out reliably, hence this method is not affected by the existence of the fluctuation.

According to the method of first embodiment, since there is no need to utilize the path search results in order to true up the phase difference, the circuit construction of the reception system becomes simpler by that portion. Moreover, since the input is held over the range required for the communication system, and the path data is reliably output, by adjusting the read timing to thereby true up the phase difference in each path, there is a characteristic in that it is not affected by the fluctuation in the input.

<Second Embodiment>

Figure 7:
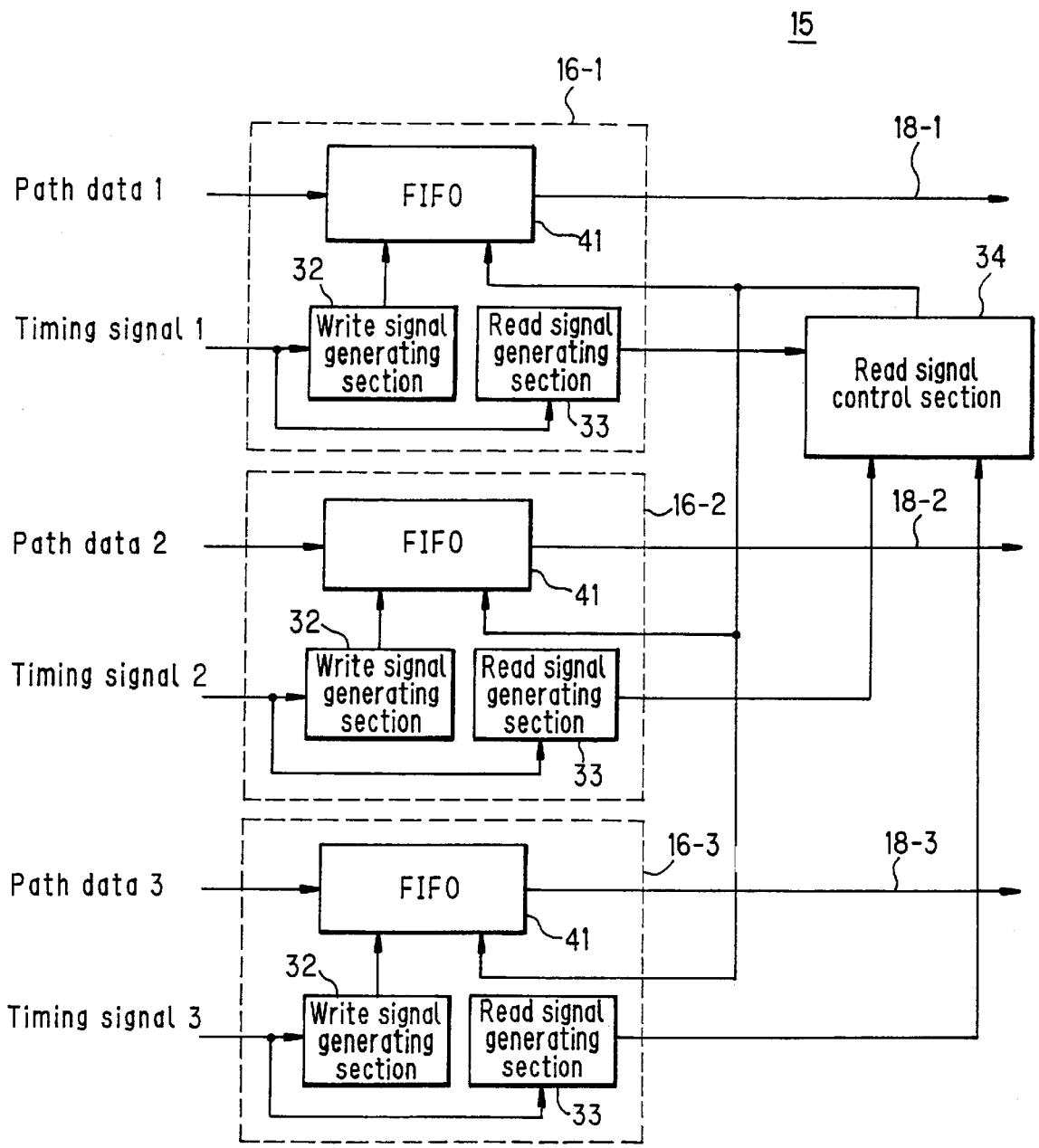
FIG. 7 is a block diagram showing a second embodiment which is a timing adjusting section of a spread spectrum receiver according to the present invention.

FIG. 7 is a block diagram showing a second embodiment of the timing adjusting section 15 of the spread spectrum receiver according to the present invention. The basic construction is approximately the same as that of FIG. 4, hence corresponding components are denoted by the same numerals and detailed description thereof is omitted.

DLLs perform synchronous capture and synchronous follow of the spread spectrum baseband signal. An observant synchronous follow characteristic is very important, the follow operation is performed by changing the pulse width of a phase control clock of a code generator. With mobile communications in which the radio propagation conditions vary on a real time basis, since an optimum synchronizing position is always changing, the output obtained during the operation has a fluctuation by the portion of operation clock due to the follow characteristic.

With the second embodiment, to realize buffer sections 16-1, 2 and 3 in the timing adjusting section 15 having no effect of fluctuations, a FIFO 41 is adopted instead of, for example, a SRAM 31. The buffer sections 16-1, 2 and 3 which realize the FIFO 41 by a logic is advantageous in view of the circuit size, than the buffer sections realized by designing the address control circuit attached outside of the SRAM 31.

In general, a SRAM is used when the data to be handled exceeds 100 words, and there is a possibility that an external control circuit for operating the existing SRAM as a FIFO may become complicated. Since the target of the present invention is a signal processing circuit which outputs several bits of data by truing up the timing within the range of several symbols, designing and realization of the FIFO by a logic can make the circuit size small. With the above-described structural example, even if fluctuations are included in the path data and timing signals input from the DLLs 14-1, 2 and 3, the characteristics of the present invention that the phase adjusting operation is performed effectively can be realized.

<Third Embodiment>

Figure 8:
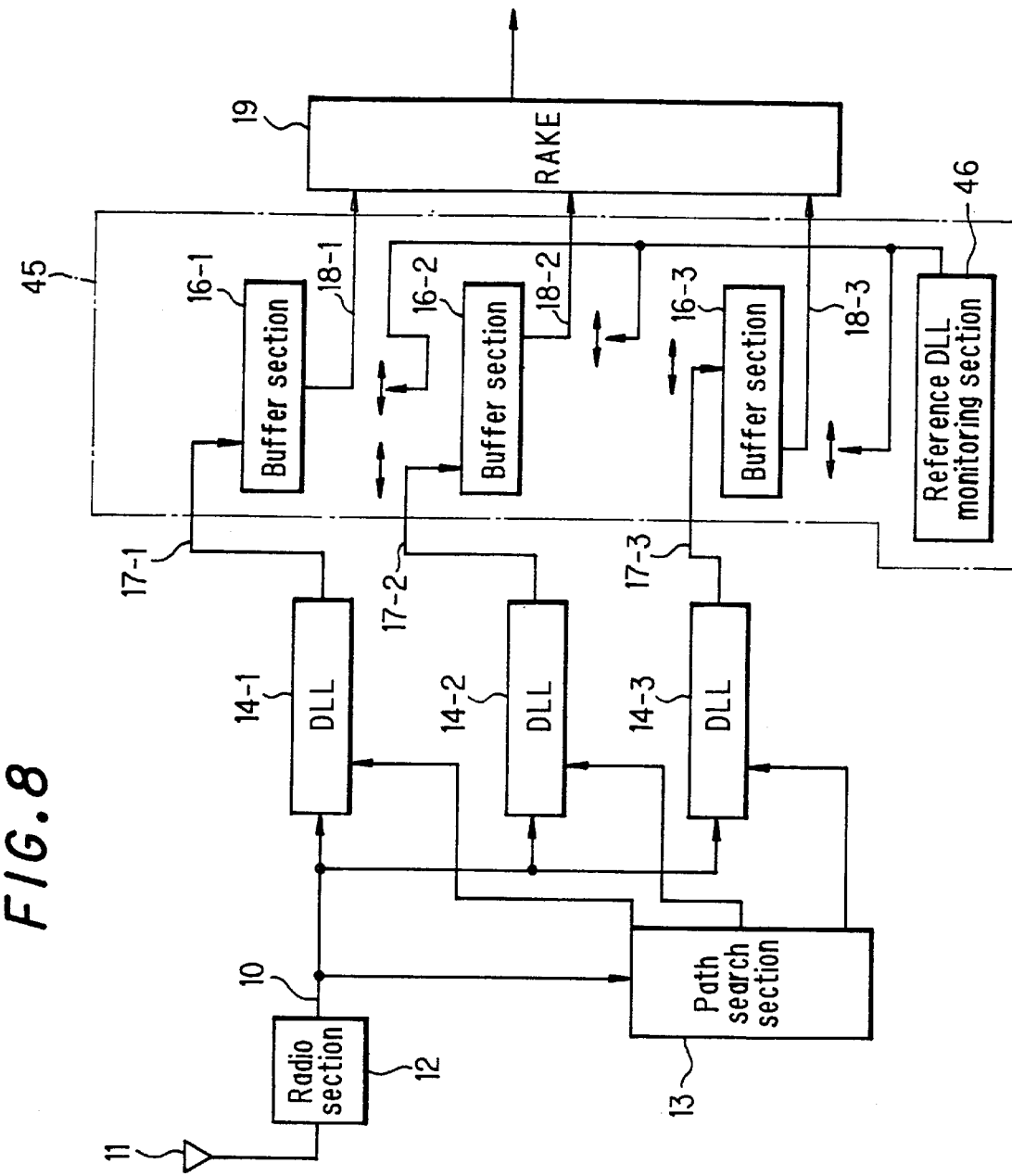
FIG. 8 is a block diagram showing a third embodiment of a spread spectrum receiver according to the present invention.

FIG. 8 is a block diagram showing a third embodiment of a spread spectrum receiver according to the present invention. This spread spectrum receiver has approximately the same construction as that of FIG. 3, hence the corresponding parts are denoted by the same numerals and detailed description thereof is omitted.

The spread spectrum receiver trues up the phases of several symbols before and behind, by matching a plurality of path data output in a unit of symbols from a plurality of DLLs 14-1, 2, 3 to the DLL output which has been specified as a fetch reference, in the same manner as in FIG. 3, to thereby perform the operation of the RAKE synthesis. With timewise changes in the radio propagation conditions, there may be a case where the peak position and the power obtained as a result of the path search change to thereby have to change the DLL output (MAINDLL) serving as the reference in the middle of operation. To correspond thereto, the spread spectrum receiver in this embodiment has a mechanism which trues up the phases in the path data without any loss, including the portion of the phase shift, by adjusting the read rate of the buffer which fetches the path data, which is described in the first embodiment, and properly adjusting the width of one symbol in a unit of the system clock of this circuit.

The system clock referred herein is an operating clock in this circuit, and a clock faster than the symbol clock or a PN clock. For example, if it is assumed that the chip rate is 4 Mcps, a clock having a sampling rate four times the chip rate, that is, 16 MHz is assumed.

As in the first embodiment, in the spread spectrum receiver in FIG. 8, the timing adjusting section 45 comprises: buffer sections 16-1, 2, 3 for storing and holding the path data from the DLL 14, and outputting the path data at a specified timing; and a read signal control section 34 for adjusting a read timing, so that the phases of the demodulated signals 17-1, 2, 3 serving as respective path data are trued up. As shown in FIG. 4, the buffer sections 16-1, 2, 3 comprise a SRAM 31, a write timing signal generating section 32, and a read timing signal generating section 33. Moreover, the timing adjusting section 45 is provided with a reference DLL monitoring section 46 which corresponds to a change in the MAINDLL, in the middle of operation as shown in FIG. 8, and adjusts the read timing, with respect to the read timing signal generating section 33 which generates the read timing signals. By means of the reference DLL monitoring-section 46 added thereto, the read signals in the respective timing adjusting sections are changed.

Figure 9:
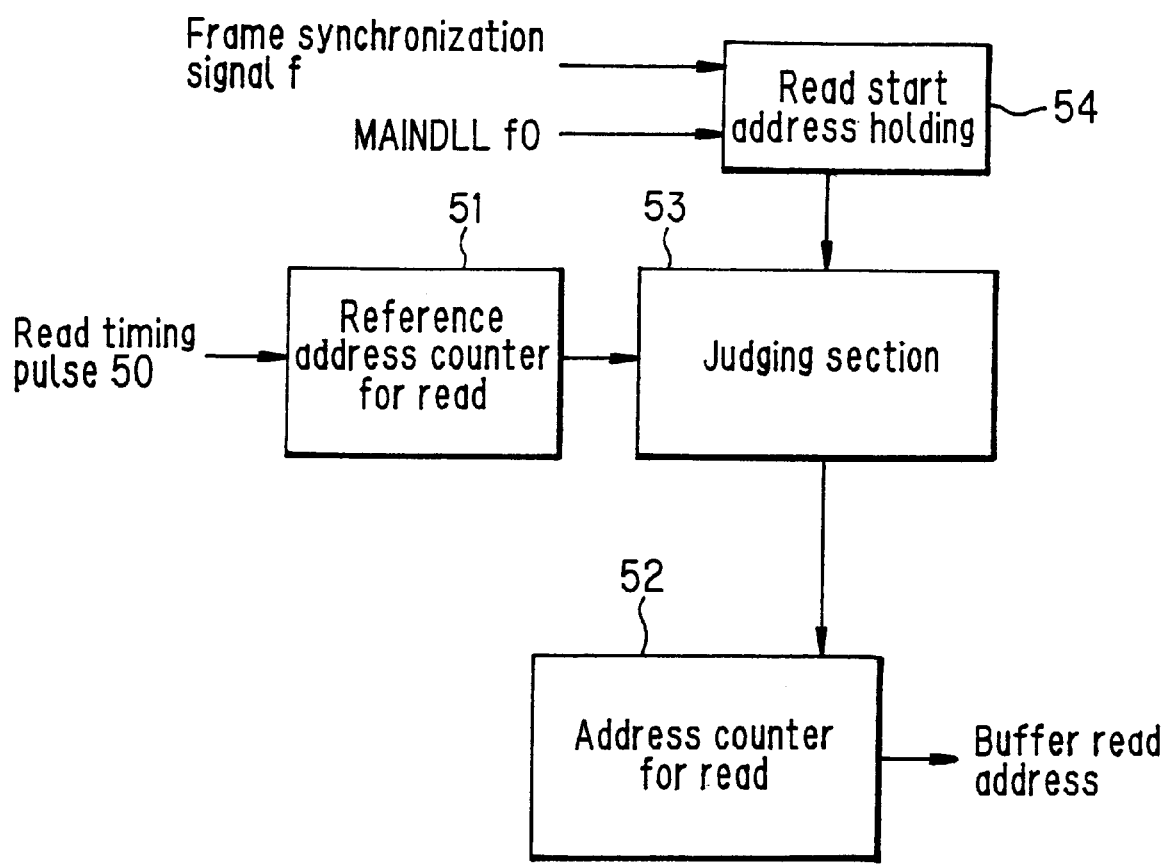
FIG. 9 is a block diagram showing a construction of a reference DLL monitoring section.

The specific construction of the reference DLL monitoring section 46 is shown in FIG. 9. A read timing pulse 50 is generated by the read timing signal generating section 33 in the timing adjusting section 45, and input to a reference address counter 51 for read, to thereby update the address serving as the reference. On the other hand, a read start address holding section 54 monitors which of the frame synchronization signals f1, f2 and f3 is specified by the MAINDLL. When the MAINDLL is changed, a judging section 53 judges the increase/decrease of the read rate, and based on the result, an address counter 52 for read operates to thereby update the address.

FIG. 10 shows a case where the phase difference in three paths, as an example, is trued up. The outputs of DLL 1 to 3 are fetched in the order of addresses from the top of the frame by means of the write timing signal from the write timing signal generating section 32 in FIG. 4, in the same manner as in the first embodiment, and taken out at a timing of the read signal control section 34. In this case, it is assumed a case where centering on the DLL1, the DLL3 precedes the DLL1, and DLL2 is demodulating more delayed path. In the figure, at first, the DLL 1 is designated as the reference DLL (MAINDLL), and the data is being taken out from the eighth stage. With regard to other DLLs, the data at the top of the frame is the data on the fourth stage as for the DLL2, and the data on the twelfth stage as for the DLL3. The number of stages referred herein does not show a specific address in the buffer, but as described in the first embodiment, expresses a read position in the buffer corresponding to the phase relations centering on the path data of the DLL serving as the reference, as seen from the path data, and gives a difference in a position to read the path data from the DLL. By giving a difference in the read position, the phase difference in the path is absorbed.

In this example, the frame synchronization signal f1 in the DLL1 is first recognized as the MAINDLL by the read start address holding section 54 in FIG. 9. Fetch and readout of the path data are performed with the same operation as in the first embodiment. Here, in a case where after the operation of the DLL2 has been stopped in the middle of the frame by changing the path, the operation is resumed at another timing, fetch is performed upon receipt of the output from the resumed DLL2, and it is changed such that the take-out from the top of the frame is performed from, for example, the sixteenth stage. Upon the change in the reception conditions, if the MAINDLL is changed from the DLL1 to the DLL3, the change of the MAINDLL is detected by the read start address holding section 54 in FIG. 9. Then, it is judged whether the read should be stepped forward or retarded by the address in the read reference address counter 51 and the judging section 53. The position of the read pointer is changed by the readout from the top of the next frame, as shown in FIG. 10, to change the read rate so that read is performed from the eighth stage, as in the DLL1. At this time, the follow is not performed instantaneously, but the speed is changed gradually. That is to say, with regard to the output signal, the symbol width is gradually changed to correspond thereto. With regard to the DLL1 and DLL2, the read pointer is changed in the same manner, so that any loss in the path data does not occur.

Next is a description of the adjustment of the output symbol width, with reference to FIG. 11.

FIG. 11 is an example of a case where two DLLs are operating, that is, the DLL is operating with two fingers, and the demodulated output a2 of the DLL2 and the frame synchronization signal f2 are delayed by 2 symbols, relative to the demodulated output a1 of the DLL1 and the frame synchronization signal f1. Considering that the phases in the path data which is in the relation of ±2 symbols are trued up, the address of the FIFO is set so that the output is performed after 2+1 symbols from the MAINDLL. Here, it is assumed that the MAINDLL is changed timewise from the posterior DLL2 to the anterior DLL1 in the middle of the frame. At this time, just after the MAINDLL is changed over, if two symbols of a portion of the phase difference between the DLL1 and the DLL2 are concentrated into one symbol and output, fetch cannot be performed well in the output of the RAKE synthesis circuit, and a problem will be caused in the synthesis. Therefore, the width of the respective symbols which constitute the frame is adjusted in a unit of the system clock with the output signal, from at the time of changing the MAINDLL. That is to say, the read rate is changed and the output symbol is reduced by the portion of excess phase difference, so that a fetch error of the path data does not occur in the RAKE synthesis section 19. The above example is a case where the MAINDLL is changed in a fater frame time-wise, but in the opposite case, the read rate is delayed to thereby widen the width of the output symbol.

As described above, according to the third embodiment, the output MAINDLL of DLLs serving as the reference is changed over, corresponding to the timewise change in the propagation condition, to perform the RAKE synthesis without changing the relation between the top of the frame and the path data and without causing any loss in the path data, hence excellent reception characteristics can be obtained.

Compared to a conventional example in which a shift register is used, when it is assumed that the MAINDLL is shifted backward timewise, with the conventional example, it is impossible to completely correspond to the situation continuously, unless number of stages of the shift register are provided ad infinitum. However, with the construction of the third embodiment, it can correspond to the situation with a limited circuit size, by making the buffer section having the FIFO construction as in the second embodiment, using the address repeatedly up to a certain degree, and changing the read rate by the changeover of the MAINDLL. Therefore, with regard to truing up the phase in the multipath, a circuit which can correspond to various situations can be realized with a limited circuit size, which has been impossible with the conventional example.

<Fourth Embodiment>

With a fourth embodiment of the present invention, in accordance with the DLL output specified as a fetch reference, by restricting a plurality of path data in a unit of symbols from a plurality of DDLs to a range expected in the system, the phase difference in several symbols before and behind is trued up to thereby perform the RAKE synthesis. The construction of the spread spectrum receiver is the same as that of shown in FIG. 3.

The circuit size may be defined so that a portion of the maximum phase difference in the path data can be fetched by the SRAM buffer 31 in FIG. 4, in the timing adjusting section 15 described in the first embodiment. According to the fourth embodiment as described above, due to the operation for truing up the phase by restricting the range to the one expected in the communication system, the circuit size can be further reduced, enabling to greatly contribute to make the reception circuit smaller and to reduce the power consumption compared to the conventional example.

With the spread spectrum receiver of the present invention according to the aforesaid gist 1, 4, 5 and 6, since the address and the timing are instructed with the read signal by the read signal control section, so that the input signal in each path held by the buffer section is output with the phase being trued up, signals in each path can be held in the buffer for a long period of time and read out reliably, without being affected by the existence of the fluctuation, as compared to a conventional example in which a shift register is used. Moreover, there is no need to utilize the result of the path search, as in the conventional example, hence the circuit construction can be made small, and thus this spread spectrum receiver is advantageous in making the circuit size small and reducing the power consumption.

With the spread spectrum receiver according to the aforesaid gist 2 and 3, by adopting a SRAM or a FIFO as a buffer for absorbing the delay, the spread spectrum receiver is not affected by the fluctuation contained in the DLL, and the circuit size can be also made small.

With the spread spectrum receiver according to the aforesaid gist 7 to 9, since changes in the signals from the DLL section serving as the reference, following the change in the reception conditions of the DLL section, are monitored, the read signal from the read control section is directly changed corresponding to the change in the reference signal, hence the reception characteristics can be improved.

With the spread spectrum receiver according to the aforesaid gist 10 to 15, even if the signal serving as the reference changes timewise, the read rate of the read signal is changed by several clocks corresponding to the change, hence the spread spectrum receiver can correspond to the change in the path following the timewise change in the propagation condition without causing any loss in the path data to thereby perform the RAKE synthesis, enabling to improve the reception characteristics. Moreover, this spread spectrum receiver can correspond to the timewise change with a limited circuit, which cannot be attained with a conventional shift register.

Also with the spread spectrum receiver according to the aforesaid gist 16, due to an operation that trues up the phase by restricting the range to the one expected in the communication system, the circuit size can be further made small.

What is claimed is:

1. A spread spectrum receiver in a CDMA system comprising:
   a radio section for detecting spread spectrum input signals and converting them to baseband signals;
   a path search section for performing a path search with respect to said baseband signals to determine the phase difference in each path;
   a DLL section for despreading and demodulating said baseband signals for each path, at a timing indicated by said path search section;
   a timing adjusting section for truing up the phase of the demodulated signals from said DLL section with a predetermined timing and outputting the signals, respectively; and
   a RAKE synthesis section for RAKE-synthesizing the signals from said timing adjusting section;
   said timing adjusting section comprising:
      a buffer section for storing and holding the signals from said DLL section based on the timing indicated by said path search section, and outputting signals in an address indicated by a read signal; and
      a read signal control section for indicating an address and a timing by means of said read signal, so that the signals in each path held by said buffer section is output with the phase being trued up.

2. A spread spectrum receiver according to claim 1, wherein said buffer section consists of a SRAM.

3. A spread spectrum receiver according to claim 1, wherein said buffer section consists of a FIFO.

4. A spread spectrum receiver according to claim 1, wherein said read signal control section outputs said read signal which trues up the phase difference in each signal timewise, based on the signal from said DLL section serving as a reference.

5. A spread spectrum receiver according to claim 2, wherein said read signal control section outputs said read signal which trues up the phase difference in each signal timewise, based on the signal from said DLL section serving as a reference.

6. A spread spectrum receiver according to claim 3, wherein said read signal control section outputs said read signal which trues up the phase difference in each signal timewise, based on the signal from said DLL section serving as a reference.

7. A spread spectrum receiver according to claim 4, wherein said timing adjusting section is provided with a reference DLL monitoring section which corresponds to a change in the signal from the DLL section serving as the reference, following a change in the reception condition of the DDL, monitors the change and changes the read signal from said read signal control section.

8. A spread spectrum receiver according to claim 5, wherein said timing adjusting section is provided with a reference DLL monitoring section which corresponds to a change in the signal from the DLL section serving as the reference, following a change in the reception condition of the DDL, monitors the change and changes the read signal from said read signal control section.

9. A spread spectrum receiver according to claim 6, wherein said timing adjusting section is provided with a reference DLL monitoring section which corresponds to a change in the signal from the DLL section serving as the reference, following a change in the reception condition of the DDL, monitors the change and changes the read signal from said read signal control section.

10. A spread spectrum receiver according to claim 4, wherein even if the signal serving as the reference changes timewise, said read signal control section changes the read rate of the read signal by several clocks according to the change.

11. A spread spectrum receiver according to claim 5, wherein even if the signal serving as the reference changes timewise, said read signal control section changes the read rate of the read signal by several clocks according to the change.

12. A spread spectrum receiver according to claim 6, wherein even if the signal serving as the reference changes timewise, said read signal control section changes the read rate of the read signal by several clocks according to the change.

13. A spread spectrum receiver according to claim 7, wherein even if the signal serving as the reference changes timewise, said read signal control section changes the read rate of the read signal by several clocks according to the change.

14. A spread spectrum receiver according to claim 8, wherein even if the signal serving as the reference changes timewise, said read signal control section changes the read rate of the read signal by several clocks according to the change.

15. A spread spectrum receiver according to claim 9, wherein even if the signal serving as the reference changes timewise, said read signal control section changes the read rate of the read signal by several clocks according to the change.

16. A spread spectrum receiver according to claim 4, wherein said timing adjusting section restricts the phase difference in each signal within a range of specifications, based on the signal serving as the reference, takes it into said buffer section, and trues up the phase timewise according to the signal from the DLL serving as the reference.

* * * * *